United States Patent [19]
Klingler

[11] Patent Number: 5,819,023
[45] Date of Patent: Oct. 6, 1998

[54] INTEGRATED CIRCUIT COMPRISING MEANS TO HALT THE PERFORMANCE OF A PROGRAM OF INSTRUCTIONS WHEN A COMBINATION OF BREAKPOINTS IS VERIFIED

[75] Inventor: Stéphan Klingler, St-Egreve, France

[73] Assignee: SGS-Thomson Microelectronics, S.A., Gentilly, France

[21] Appl. No.: 443,816

[22] Filed: May 18, 1995

[30] Foreign Application Priority Data

May 20, 1994 [FR] France ................................. 94 06490

[51] Int. Cl.⁶ ............................ G06F 11/30; G06F 11/25
[52] U.S. Cl. .................................. 395/183.1; 395/183.11; 395/704; 235/438
[58] Field of Search ..................................... 395/800, 700, 395/183.21, 704, 183.1, 183.11; 235/438

[56] References Cited

U.S. PATENT DOCUMENTS

| | | | |
|---|---|---|---|
| 5,126,541 | 6/1992 | Shinagawa | 235/438 |
| 5,535,331 | 7/1996 | Swoboda et al. | 395/183.21 |

FOREIGN PATENT DOCUMENTS

| | | | |
|---|---|---|---|
| 0189848 | 8/1986 | European Pat. Off. | |
| A-0-445-042 | 9/1991 | European Pat. Off. | |
| 0455946 | 11/1991 | European Pat. Off. | |

OTHER PUBLICATIONS

Ken Marti, "Use a Logic Analyzer to Debug Real–Time Software," *EDN Electric Design News*, vol. 34, No. 8, p. 193 (1989).

*Primary Examiner*—Alyssa H. Bowler
*Assistant Examiner*—John Follensbee
*Attorney, Agent, or Firm*—Robert Groover; Matthew Anderson

[57] ABSTRACT

The integrated circuit comprises a central processing unit, a program memory containing a program of instructions connected to the central processing unit by an address bus, a data bus and lines giving control signals for read and write access to this memory, the instructions being carried out by the central processing unit, and at least one data memory connected to the central processing unit by an address bus, a data bus and lines giving control signals for read and write access to this memory. The circuit comprises breaking means enabling the defining of a combination of conditions pertaining to the values present on two of the buses of the memories and to the values of the control signals for access to at least one of these memories, and halting the performance of the instructions if these conditions are verified. The disclosed device is especially valuable for testing an application program of the integrated circuit.

15 Claims, 5 Drawing Sheets

INTEGRATED CIRCUIT COMPRISING MEANS TO HALT THE PERFORMANCE OF A PROGRAM OF INSTRUCTIONS WHEN A COMBINATION OF BREAKPOINTS IS VERIFIED

BACKGROUND OF THE INVENTION

1. Field of the Invention

The invention relates to an integrated circuit comprising means to halt the performance of a program of instructions when a combination of breakpoints is verified.

It is known that many integrated circuits, such as application specific integrated circuits or ASICs, comprise a central processing unit or processor and at least one program memory of the read-only memory (ROM) type connected to the central processing unit by an address bus, a data bus and lines giving control signals for read and write access to this memory and containing a program of instructions carried out by this central processing unit.

When an integrated circuit such as this has been made on a silicon chip, various tests have to be applied to it to check its operation. Thus, tests are carried out firstly on the constitution of the circuit (the characteristics of the components, connections, etc.), and, secondly, on the program contained in the program memory or the way in which the circuit carries it out.

2. Description of the Prior Art

For the testing of the program, there are known ways of defining conditions for halting the performance of the instructions of the program in such a way that, if these conditions are verified, the performance of the instructions is halted. These conditions form what are called breakpoints. To this end, the integrated circuit comprises storage and comparison means for the memorizing, for example, of a value of an address of the program memory defined by the user, comparing this value with the value present in the instruction address bus and halting the performance of the instructions when these values are equal.

This type of test by breakpoint enables the verification, for example, of those values that are positioned on buses providing access to the central processing unit following the performance of a particular instruction. Once the verification of the values is done, the performance of the instructions may be resumed possibly after modifying the break conditions for halting the subsequent performance (the instructions being placed sequentially in the program memory).

This type of test, originally designed to test the running of the program in an integrated circuit comprising only one memory, has drawbacks when the circuit comprises, for example, in addition to the program memory, data memories connected also to the central processing unit by address buses, data buses and lines giving control signals for read arid write access to these memories. Indeed, if the circuit has only a program memory, there is a priori knowledge of the contents of the addresses of this memory. By contrast, if the circuit has a data memory in which, for example, memory spaces will be set aside to store data elements of variable value, it will not be possible to halt the program by laying down, as a condition, that a data element of variable value, memorized at a given address, should have a certain value. Either the breakpoint will relate to the address bus of the data memory, in which case the program will be halted at each access to the address of the memory irrespectively of the value of the data element memorized at this address, or the breakpoint will relate to the data bus, in which case the program will be halted irrespectively of the address of the memory at which it is desired to store the given value.

In practice, it may thus happen that the performance of the instructions is halted very many times without the expected event's occurring. This increases the testing time of the program unnecessarily. The same would be the case if it were desired, for example, to halt the performance of the instructions when the performance of an instruction included in a program loop prompts an access to a certain address of the data memory.

In view of the above, the invention is aimed at proposing an integrated circuit that optimizes the testing of a program of instructions should this circuit comprise at least two memories, this circuit comprising means to combine the breakpoints with one another.

SUMMARY OF THE INVENTION

The invention thus proposes an integrated circuit comprising:

- a central processing unit,
- a program memory containing a program of instructions connected to the central processing unit by an address bus, a data bus and lines giving control signals for read and write access to this memory, the instructions being carried out by the central processing unit,
- and at least one data memory connected to the central processing unit by an address bus, a data bus and lines giving control signals for read and write access to this memory,
- wherein the circuit comprises breaking means defining a combination of conditions pertaining to the values present on two of the buses of the memories and to the values of the control signals for access to at least one of these memories, and halting the performance of the instructions if these conditions are verified, the halting being delayed if the conditions that are verified are related to the address buses, and the verification of the conditions being delayed in comparison with the appearance of the values on the buses if the conditions are related to the data buses.

It is thus possible to optimize the testing of a circuit comprising at least two memories by proposing the combination of breakpoints between two memories, or between the address bus and data bus of one and the same memory.

Advantageously, the circuit is one wherein the breaking means halt the performance of the instructions if the conditions of a combination are verified during the processing of one and the same instruction.

It is thus possible to test the simultaneity of two breakpoints.

Advantageously, the circuit is one wherein the breaking means do not halt the performance of the instruction unless, during the processing of an instruction, the conditions of a combination relating to the value present on a bus of one of the memories and to the values of the control signals for access to this memory are verified, the other conditions of the combination relating either to the value present at the other bus of this memory or to the value present at a bus of the other memory and to the values of the control signals for access to this other memory that have been verified previously during the processing of another instruction.

It is thus possible to test the consecutive nature of two breakpoints.

Advantageously, the circuit is arranged in such a way that if an instruction is decoded while conditions are verified, the breaking means halt the performance of the instructions after the performance of this instruction.

It is thus provided that any decoded instruction will be carried out. The processing of an instruction comprises successively an addressing phase, a decoding phase and a performance phase. Thus, a central processing unit processing the instructions in a so-called pipeline manner wherein, when an instruction is carried out, a simultaneous decoding is made of the next instruction, and there will be no need to re-decode the instruction following an instruction whose performance corresponds to the verification of the break conditions.

BRIEF DESCRIPTION OF THE DRAWINGS

The invention will be understood more clearly and other particular features and advantages of the invention shall appear from the following description of a preferred and non-restrictive exemplary embodiment read in conjunction with the appended drawings, of which.

MORE DETAILED DESCRIPTION

Figure 1:
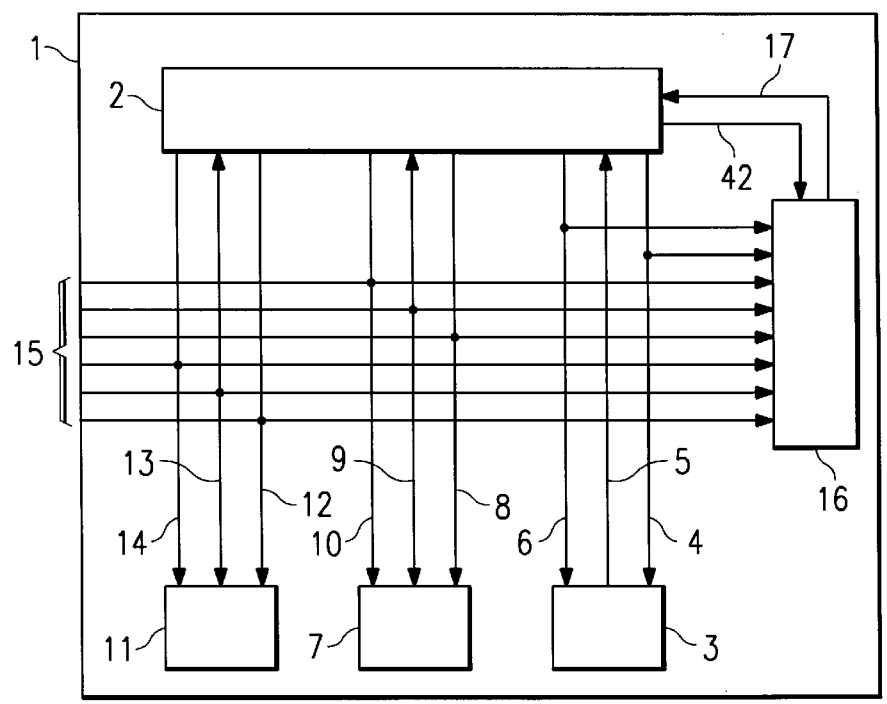
FIG. 1 shows a drawing of an integrated circuit according to the invention.

Referring to FIG. 1, an integrated circuit 1 according to the invention comprises:

- a central processing unit 2,
- a program memory 3 connected to the central processing unit 2 by an address bus 4, a data bus 5 and lines collectively represented by a reference 6, giving a read access control signal and a write access control signal,
- a first data memory 7 connected to the central processing unit 2 by an address bus 8, a data bus 9 and lines represented collectively by a reference 10, giving a read access control signal and a write access control signal, and
- a second data memory 11 connected to the central processing unit 2 by an address bus 12, a data bus 13 and control lines collectively represented by a reference 14, giving a read control signal and a write control signal.

In one example, the integrated circuit 1 is dedicated to the processing of signals and the central processing unit 2 has the essential elements of a signal processor, the two data memories 6 and 11 enabling the processing of the data elements in parallel. A circuit such as this naturally has other devices such as, for example, one or more interface devices, computation devices etc. not shown herein.

In the example described, the address and data' buses and the lines giving the control signals for access to the data memories 6 and 11 are connected to primary access points 15 of the integrated circuit 1.

Figure 2:
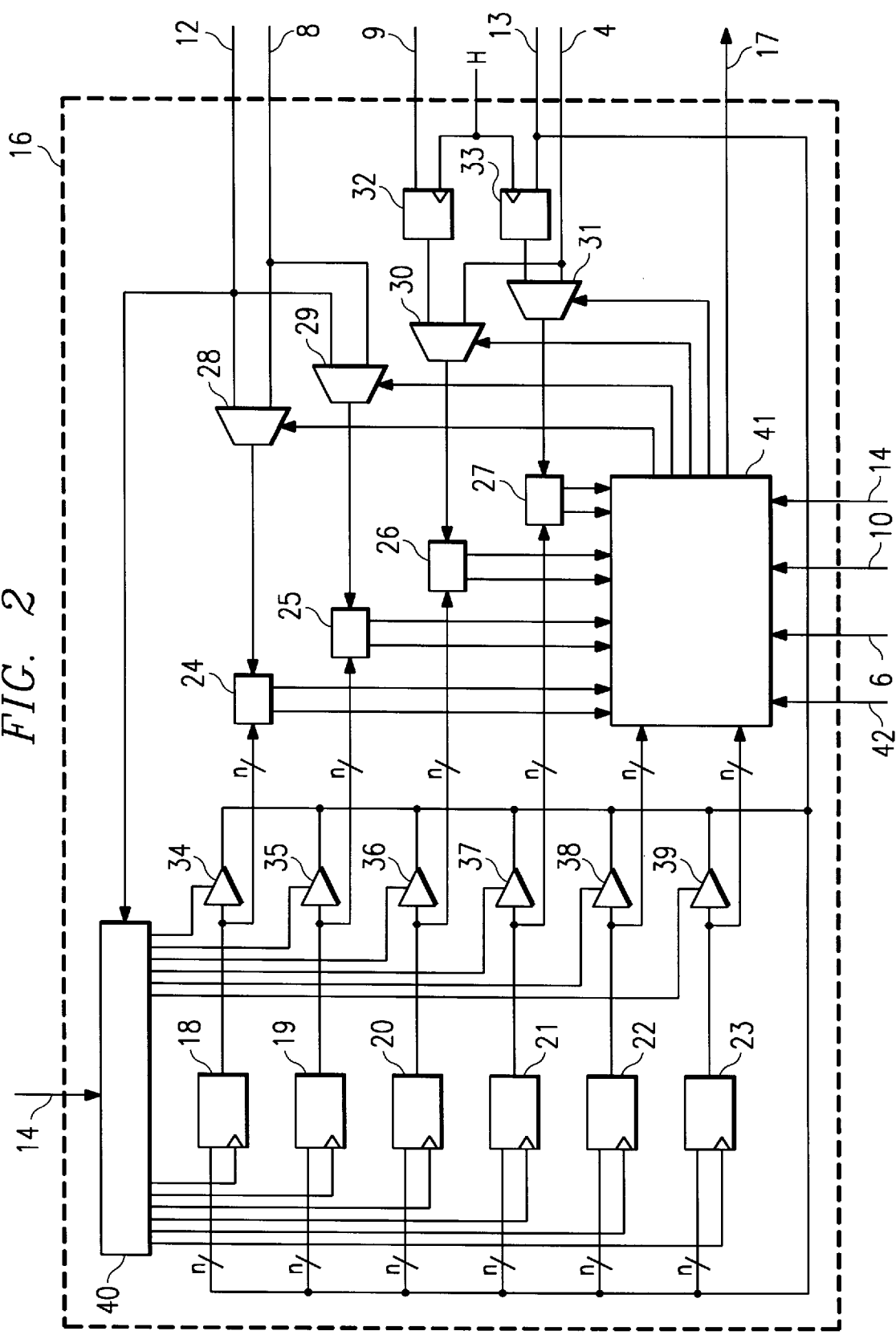
FIG. 2 shows a drawing of a part of the circuit of FIG. 1, this part comprising breaking means to produce a signal to halt the performance of the instructions.

The integrated circuit 1 also has a so-called break circuit 16 illustrated in FIG. 2 connected to the address bus 4 and to the lines 6 of the program memory 3 and to the address buses 8 and 12, the data bus 9 and 13, and the lines 10 and 14 of the data memories 7 and 11. Conventionally, the program memory 3 contains a program of instructions that can be performed by the central processing unit 2. The break circuit is also connected to the central processing unit 2 by a line 17 giving a control logic signal HALT in such a way that the performance of the instructions is halted when the signal HALT is in a given logic state, for example if HALT=1.

The break circuit 16, illustrated in FIG. 2, has six master-slave registers 18, 19, 20, 21, 22 and 23, four comparison circuits 24, 25, 26 and 27, and one control circuit 41.

In one example, the six master-slave registers are parallel-parallel type registers, namely with n inputs and n outputs, n being an integer.

The inputs of the six registers are all connected to n wires of a bus comprising at least n wires. In the example, the bus chosen is the data bus 13 of the second data memory 11.

Similarly, the outputs of the six registers are all connected to n wires of this same bus by tristate buffer circuits, thus enabling the outputs of the registers of the bus to be isolated or cut off.

Each register receives a logic control signal such that, for example, it carries out a sampling on the leading edge of this signal.

The control signals are given to the registers by a decoding circuit 40 that is connected to the address bus 12 of the second memory 11.

This decoding circuit 40 also gives control logic signals to each tristate buffer circuit for the connection or isolation of the outputs of the registers of the data bus 13. Finally, the decoding circuit 40 is also connected to the lines 14 giving the access control signals associated with the memory 11.

The master-slave registers 18 to 23 are, in the example, memory mapped configurable registers. This type of register, which is known per se, is accessible in reading mode for the reading of the contents thereof or in writing mode for the storage therein of values, and is used in the example to memorize the breakpoints (or break conditions) associated with the different buses of the memories of the circuit 1, except for the data bus 5 of the program memory.

In order to carry out reading or writing operations in these registers, they are assigned an address corresponding to an address of the second data memory 11. When the decoding circuit 40 recognizes an address of one of the registers on the address bus 12, it produces the appropriate signals to position the contents of the register on the data bus 13 or store the values of the n wires of this bus, connected to the n inputs of this register, in the register, according to the value of the control signals for access to the memory 11.

Thus, it is provided that the breakpoints will be programmable and that the registers used to memorize these breakpoints will be accessible without links specifically dedicated to this purpose. This makes it possible to restrict the number of terminals of the integrated circuit and also limit the surface area of this circuit. These memory mapped registers could equally well have been connected to the data bus of the first data memory.

In the example described, the buses of the different memories shall all be considered to have an identical number n of wires. For example, n=16.

The first four master-slave registers 18 to 21 are each connected, by means of their n outputs, to one of the four comparison circuits 24 to 27. Each comparison circuit has n inputs connected to n outputs of one of the registers 18 to 21, n other outputs connected to n outputs of one among four multiplexers and two outputs connected to the control circuit 41 to give it logic signals representing the comparison between the values presented at its n inputs connected to one of the registers and its n inputs connected to the output of one of the multiplexers.

The logic signals representing the comparison could, for example, be a signal representing an equality between the two series of inputs if it is in a given logic state, for example the state 1, and a signal representing a superiority, the comparison being done naturally on binary numbers, of the value encoded on n bits, presented at output of the register, as compared with the value presented on the n outputs of the multiplexer, when this second signal is in a given logic state, for example the state 1. These signals could equally well represent relationships of difference, of inferiority which may or may not be strict, etc.

Letting VR reference the value, encoded on n bits, received by one of the comparison circuits from one of the registers and letting VM represent the value, encoded on n bits, received by this same comparison circuit from one of the multiplexers and encoding the result of the comparison of VR and VM on two logic states, all the possible instances are covered: VR=VM, VR≠VM, VR>VM, VR<VM, VR≧VM and VR≦VM.

The first comparison circuit 24 is connected to a first multiplexer 28 receiving, at input, the n wires from the address bus 12 and the n wires from the address bus 8. This multiplexer receives, from the control circuit 41, a control logic signal for the selective connection of its n output wires to the n wires of the bus 12 or to the n wires of the bus 8. At its other inputs, the first comparison circuit is connected to the n outputs of the register 18.

The second comparison circuit 25 is connected to a second multiplexer 29 also receiving, at input, the n wires of the address bus 12 and the n wires of the address bus 8. This multiplexer receives a logic control signal from the control circuit 41 to selectively connect its n output wires to the n wires of the bus 12 or to the n wires of the bus 8. At its other inputs, the second comparison circuit is connected to the n outputs of the register 19.

The third comparison circuit 26 is connected to a third multiplexer 30 receiving, at input, firstly, the n wires of the address bus 4 and secondly, the n wires of the data bus 9 by means of n outputs of a master-slave register 32 having n inputs connected to the n wires of this bus 9. As here above, this third multiplexer receives a control logic signal from the control circuit 41 for the selective connection of n of its inputs to its n outputs. At its other inputs, the third comparison circuit is connected to the n outputs of the register 20.

The fourth comparison circuit 27 is connected to a fourth multiplexer 31 receiving at input, firstly, the n wires of the address bus 4 and, secondly, the n wires of the data bus 13 by means of n outputs of a master-slave register 33 having n inputs connected to the n wires of this bus 13. As here above, this fourth multiplexer receives, from the control circuit 41, a control logic circuit for the selective connection of n of its inputs to its n outputs. At its other inputs, the fourth comparison circuit is connected to the n outputs of the register 21.

The last two master-slave registers 22 and 23 are connected to the control circuit 41 by their n outputs, this control circuit being furthermore connected to the lines 6, 10 and 14 giving the control signals for access to the different memories.

Finally, the control circuit has one output connected to the line 17 giving the logic signal HALT to the central processing unit 2.

The aim of the circuit 16 is to enable the halting of the performance of the instructions of the program contained in the program memory 3 when conditions (or breakpoints) are verified relating to a particular bus among the buses connecting the memories to the central processing unit or when a combination of conditions or breakpoints is verified on two different buses among these buses.

Thus, by using one of the comparison circuits 24 or 25, it is possible to place a breakpoint on the address bus of one of the data memories. By using these two circuits simultaneously, a breakpoint could be placed on the two address buses simultaneously.

By using the comparison circuits 26 and 27, a breakpoint could be placed either on the data bus of a data memory or on both data buses of both memories or on the address bus of the program memory or on this address bus and one of the data buses.

By using one of the comparison circuits 24 or 25 simultaneously with one of the comparison circuits 26 or 27, it is possible to place a breakpoint according to choice on the address bus and the data bus of one and the same data memory, on the address buses of a data memory or of the program memory, etc.

The expression "placing a breakpoint" is understood to define conditions such that if these conditions are verified by means of the control circuit 41, the performance of the instructions by the central processing unit is halted.

Figure 3:
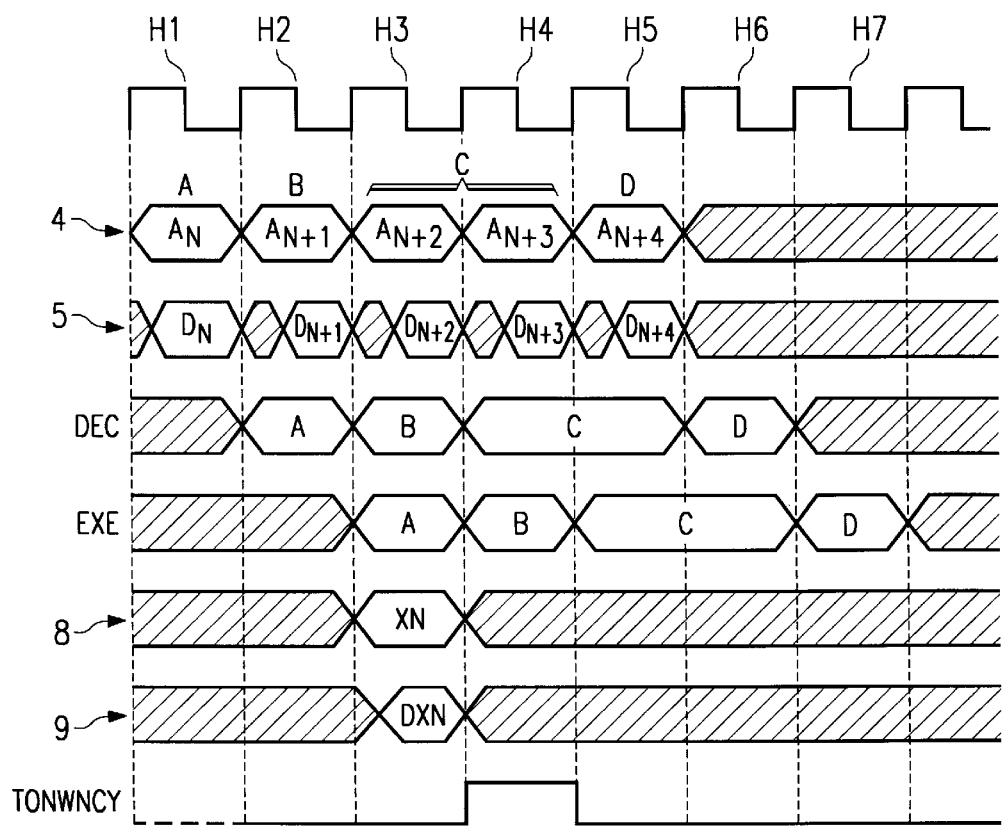
FIG. 3 is a timing diagram illustrating a pipeline type of structure.

FIG. 3 illustrates a timing diagram representing signals that can be found on the different data and address buses of the memories of the circuit.

Conventionally, the processing of an instruction to be carried out is characterized successively by:

the positioning, by a program counter (not shown), of the address of the word or of the successive addresses of the words (the term "word" refers to the contents present at an address of the program memory) of the instruction on the address bus 4 of the program memory, the decoding of the words by a sequencer (not shown) after they are positioned by the program memory on the data bus 5, the performance of the instruction by the central processing unit.

Typically, these operations are synchronized on a clock signal H produced for example by a quartz crystal.

FIG. 3 shows a sequencing of the successive operations for the processing of instructions in a commonly used pipeline type structure. In this type of sequencing, the addresses are positioned on the bus 4 at the same time as the corresponding words are decoded at the preceding addresses and as the instructions corresponding to the previously decoded words are carried out.

FIG. 3 exemplifies a succession of four instructions A, B, C, D, the instructions A, B and V requiring only one access to the program memory and the instruction C requiring two of them.

Thus:

A is encoded on a word referenced $D_N$ located at an address of the program memory referenced $A_N$, B is encoded on a word referenced $D_{N+1}$ located at an address of the program memory referenced $A_{N+1}$, C is encoded on two words referenced $D_{N+2}$ and $D_{N+3}$ located at two address of the program memory referenced $A_{N+2}$ and $A_{N+3}$, D is encoded on a word referenced $D_{N+4}$ located at an address of the program memory referenced $A_{N+4}$.

In the example described, it is assumed that the synchronizing of the different addressing, decoding and performance operations is done on a leading edge of the clock signal.

Taking Hj, with j as an integer, to represent successive cycles (or periods of the clock signal) and taking H1 to reference the cycle corresponding to the positioning of the addresses $A_N$ on the address bus of the program memory, we will have the following timing diagram:

H1: addressing of the word $D_N$ of the instruction A,

H2: addressing of the word $D_{N+1}$ of the instruction B, decoding of A,

H3: addressing of the word $D_{N+2}$ of the instruction B, decoding of B, performance of A, H4: addressing of the word $D_{N+3}$ of the instruction C at the start of the decoding of C, performance of B, H5: addressing of the word $D_{N+4}$ of the instruction D, end of the decoding of C, start of the performance of C, H6: decoding of D, end of the performance of C, H7: performance of D.

When an address is positioned on the address bus of a memory so as to read the contents of the memory at this address, these contents are placed during the same cycle on the data bus of this memory, with a certain delay with respect to the start of the cycle. This delay results from the time needed for the memory to access this address and the time needed for the memory to position the contents of the address on its data bus.

Furthermore, it can be seen that there is a period of time corresponding to two cycle periods between the start of the cycle during which the address of a word is positioned on the address bus of the program memory and the start of the cycle during which this word has an effect on the electrical state of the other buses of the circuit. Thus, if the instruction A corresponds to the reading of the contents of an address XN of the data memory 7, this address XN will be positioned on the address bus 8 of this memory at the start of the cycle H3 and the contents of this address XN will be positioned on the data bus 9 of this memory during the cycle, a certain period of time after the start of this cycle.

Finally, FIG. 3 shows a logic signal TONWNCY produced by the central processing unit in such a way that if an instruction requires q cycles for its decoding, q being an integer greater than 1, then this signal is in a given state, herein the state 1, during the q-1 first cycle periods needed for the decoding of this instruction. If not it is in the complementary state. Thus, herein, the signal TONWNCY is in the state 1 during the cycle H4. If not it is in the state 0. This signal is received by the control circuit 41 by means of a line 42 connecting it to the central processing unit.

We shall now describe circuits implemented in the circuit 16, examining different cases representing possibilities of management of breakpoints provided by the invention.

FIGS. 4 to 9 illustrate elements of the control circuit 41 enabling the production of the logic signal HALT.

As indicated, the control circuit receives the signals enabling a knowledge of the result of the comparison between the values received by each comparison circuit and the control signals providing access to the different memories.

The definition of the break conditions or conditions for halting the performance of the program will therefore logically comprise:

the selection of one or two buses to which the breakpoint relates, this selection having direct influence on the values of the control signals of the multiplexers 28 to 31, the selection of the state of the control signals for access to the memory or memories to which these buses correspond, the selection of a relationship between the value or values contained in the registers 18 to 21 and the value or values present on this bus or these buses.

An analysis of the different examples that may be envisaged has led to the definition, as seen here above, of three types of breakpoints:

one type of breakpoint that could be called a conventional breakpoint relating to the values of a bus of one of the memories, one type of breakpoint called a simultaneity breakpoint relating to a combination of the values present on two buses, this combination having to be verified during the processing of one and the same instruction, one type of breakpoint called a consecution breakpoint relating to a combination of the values present on two buses in such a way that the performance of the instructions is halted if conditions are verified for one bus while the other conditions have been previously verified for the other bus.

In practice, it is possible, for each type of breakpoint, to define a number of valuable applications by restricting this number in order to limit the size of the control circuit:

Conventional type (five examples): breakpoint on the address bus of one of the memories or on the data bus of one of the data memories. In principle, the values present in the data bus of the program memory are not taken note of since the contents of this memory are known on an a priori basis.

Simultaneity type (six cases): breakpoint on the buses of one data memory, on the address buses of the data memories, on the data buses of the data memories, on the address buses of a data memory and of the program memory.

Consecution type (seven cases): breakpoint on the address buses of a data memory and of the program memory with antecedence of the verification of conditions on the bus of the program memory, on the address buses of the data memories with antecedence of the verification of conditions, on the bus of one of the memories, on the data bus and address bus of a data memory with antecedence of the verification of conditions on the address bus of the memory, on the address bus of the program memory with antecedence of the verification of the presence of a certain value on this bus with respect to the verification of the presence of another value.

In the invention, the breakpoints can be configured, namely it is possible to change the different parameters defined here above and the registers 22 and 23 are used to memorize the desired conditions.

Letting R0 to Rn-1 reference the values stored in the register 22, and R'0 to R'n-1 the values stored in the register 23, it is possible, for example, to assign:

R0 to the selection of the bus linked to the comparison circuit 24 by means of the multiplexer 28, R1 and R2 to the selection of the state of the signals for access to the memory corresponding to the selected bus, R3 and R4 to the selection of a relationship between the value present at the output of the register 18 and the value present on the selected bus, R5 and R6 to the selection or non-selection of a combination of conditions between the bus selected by R0 and another bus connected to one of the comparison circuits 25 or 26, R7 to the selection of the bus connected to the comparison circuit 25 by means of the multiplexer 29, R8 and R9 to the selection of the state of the signals for access to the memory corresponding to the selected bus, R10 and R11 to the selection of a relationship between the value present at the output of the register 19 and the value present at the selected bus, R12 and R13 to the selection or non-selection of a combination of conditions between the bus selected by R5 and another bus connected to one of the comparison circuits 24 or 27, R14 and R15: not assigned, R'0 to the selection of the bus connected to the comparison circuit 26 by means of the multiplexer 30, R'1 and R'2 to the selection of the state of the signals for access to the memory corresponding to the selected bus, R'3 and R'4 to the selection of a relationship between the value present at the output of the register 20 and the value present on the selected bus, R'5 and R'6 to the selection or non-selection of a combination of conditions between the bus selected by R'0 and another bus connected to the comparison circuit 27, R'7 to the output of the bus connected to the comparison circuit 27 by means of the multiplier 31, R'8 and R'9 to the selection of the state of the signals for access to the memory corresponding to the selected bus, R'10 and R'11 to the selection of a relationship between the value present at the output of the register 21 and the value present on the selected bus, R'12 to R'15: not assigned.

A description shall now be given of the means implemented for the processing of five of the cases described here above.

Figure 4:
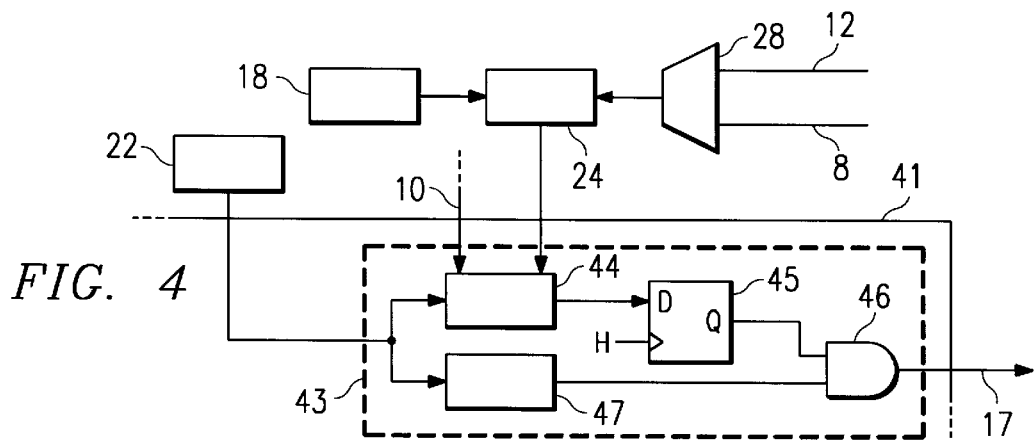
FIGS. 4 to 9 illustrate circuits implemented in different breakpoint configurations.

Breakpoint on an Address Bus of a Data Memory (FIG. 4)

FIG. 4 illustrates the means implemented where it is desired to place a breakpoint on the address bus 8 of the data memory 7.

To check that the break conditions are verified, it is possible to use one of the comparison circuits 24 or 25 according to choice. In the example described, the circuit used is the comparison circuit 24, the value present on the address bus 8 being actually compared with the value present at the outputs of the register 18.

To make it possible to halt the performance of instructions by the central processing unit, the control circuit 41 includes a circuit 43 to give the logic signal HALT.

This circuit 43 comprises:

a comparison circuit 44, a master-slave flip-flop circuit 45 carrying out a sampling on a leading edge of the clock signal H, a two-input AND logic circuit 46, a selection circuit 47.

The comparison circuit 44 is connected to the lines 10 conveying the control signals for access to the memory 7. It is also connected to the outputs of the comparison circuit 24 and to outputs of the register 22. This circuit 44 has one output to give a logic signal such that this signal is in a given state if the break conditions stored in the register 22 are verified on the lines 10 and the outputs of the comparison circuit 24. For example, the signal produced by the comparison circuit 44 will be in the state 1 if the conditions are verified. If not it will be in the state 0.

The output of the comparison circuit 44 is connected to the input of the flip-flop circuit 45. The output of this flip-flop circuit 45 is connected to an input of the AND logic gate 46. The other input of this AND gate is connected to an output of the selection circuit 47. This circuit 47, which is not described, is connected to outputs of the register 22 and arranged in such a way that the signal present at its output is in the state 1 if the values of the bits of the register 22 correspond to the selection of a breakpoint on the bus 8.

The output of the AND gate 46 is connected to the line 17 conveying the signal HALT.

Thus if, during one cycle, all the conditions expected are verified on the address bus 8 and the lines 10, the signal HALT will go to 1 at the start of the next cycle.

To place a breakpoint on the address bus 12 of the other data memory 11, it is enough to duplicate the circuit 43 by adapting the links between the circuit and its environment to this particular case.

Figure 5:
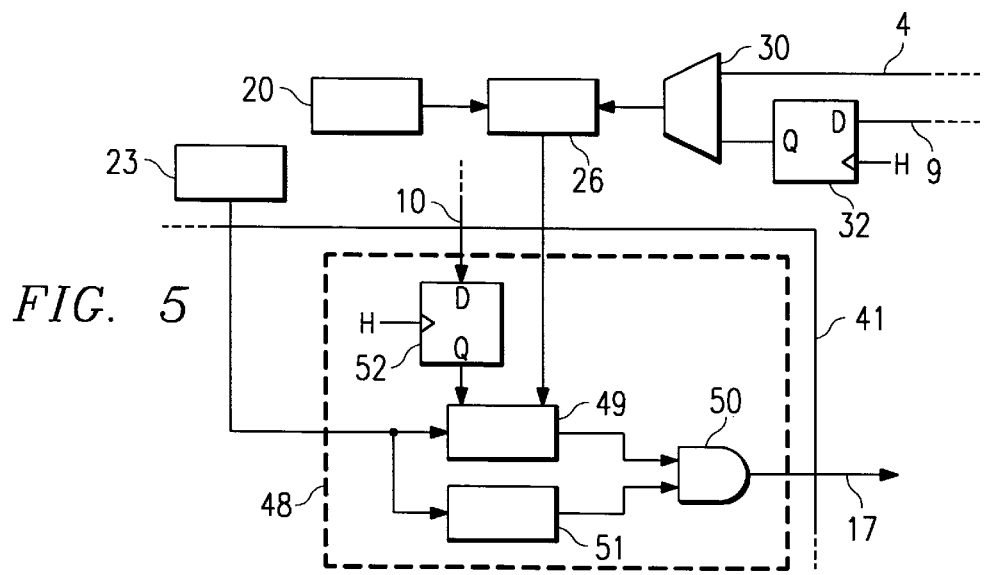

Breakpoint on a Data Bus of a Data Memory (FIG. 5)

FIG. 5 illustrates the means implemented when it is desired to place a breakpoint on the data bus 9 of the data memory 7.

To ascertain that the conditions of the breakpoint are verified, the comparison circuit 26 is used. The value present on the data bus 9 is compared with the value present on the outputs of the register 20.

To make it possible to halt the performance of instructions by the central processing unit, the control circuit 41 comprises a circuit 48 to give the logic signal HALT.

This circuit 48 comprises:

a comparison circuit 49, a two-input AND logic gate 50, a selection circuit 51, a master-slave flip-flop circuit 52 with two inputs and two outputs, carrying out sampling on a leading edge of the clock signal.

The master-slave flip-flop circuit 51 receives the lines 10 at its output. These lines 10 convey the control signals for access to the memory 7.

The comparison circuit 49 is connected to the outputs of the flip-flop circuit 51, the outputs of the comparison circuit 26 and the outputs of the register 23. This circuit 44 has an output to give a logic signal such that this signal is in a given state if the break conditions memorized in the register 23 are verified on the lines 10 and the outputs of the comparison circuit 26. For example, the signal produced by the comparison circuit 44 will be in the state 1 if the conditions are verified. If not it will be in the state 0.

The output of the comparison circuit 49 is connected to an input of the AND logic gate 50. The other input of this AND gate 50 is connected to an output of the selection circuit 51 which plays a role equivalent to that of the selection circuit 47 of FIG. 4.

The output of the AND gate 50 is connected Lo the line 17 conveying the signal HALT.

Thus if, during a cycle, all the expected conditions are verified on the data bus 9 and the lines 10, the signal HALT will go to 1 at the start of the next cycle.

In the case of a data bus, the data elements are not positioned on the bus at the start of a cycle but during a cycle. This is why, instead of delaying the halt after comparison, as in the cases described here above, the comparison is delayed by means of the flip-flop circuits 52 and 32 (in the case of the bus 9), the flip-flop circuit 32 carrying out the sampling on the leading edge of the clock signal H.

To place a breakpoint on the data bus 13 of the other data memory 11, it is enough to duplicate the circuit 48 by adapting the links between this circuit and its environment to this particular case.

Figure 6:
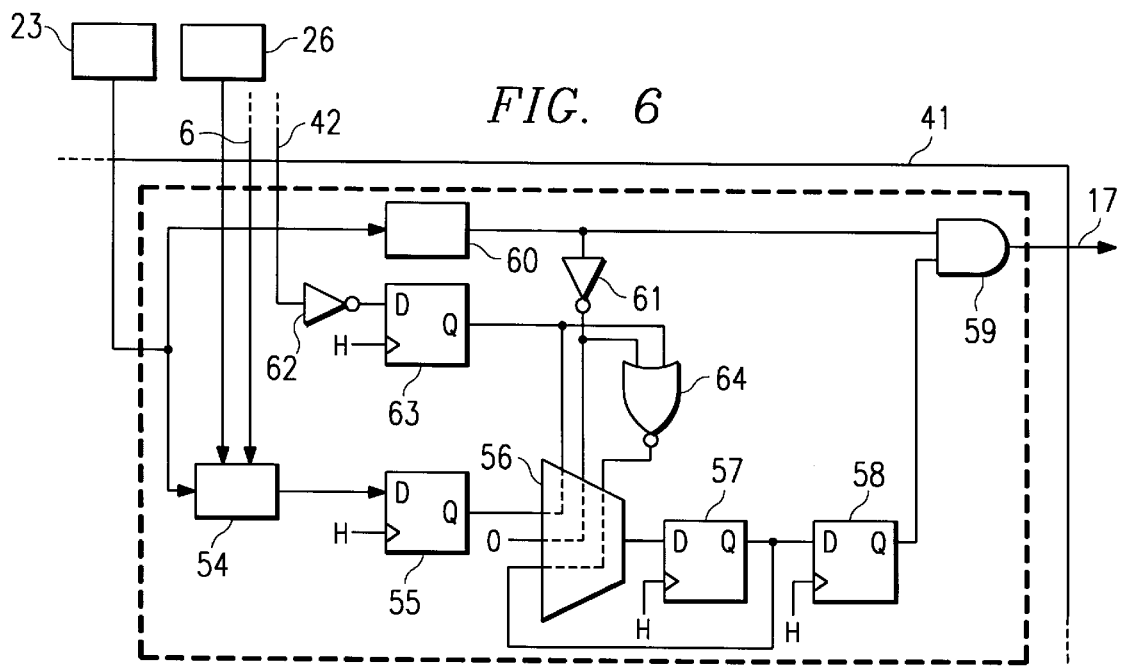

Breakpoint on the Address Bus 4 of the Program Memory 3 (FIG. 6)

FIG. 6 illustrates the means implemented when it is desired to place a breakpoint on the address bus 4 of the program memory 3.

To check that the conditions of the breakpoint are verified, one of the comparison circuits 26 or 27 is used according to choice. In the example shown, the comparison circuit 26 is used. The value present on the address bus 4 is compared with the value present on the outputs of the register 20.

To make it possible to halt the performance of instructions by the central processing unit, the control circuit 41 comprises a circuit 53 to give the logic signal HALT.

This circuit 53 comprises:
- a comparison circuit 54,
- a first master-slave flip-flop circuit 55 carrying out a sampling on the leading edge of the clock signal H,
- a multiplexer 56 with three inputs and one output,
- a second master-slave flip-flop circuit 57 sampling on a leading edge of the clock signal H,
- a third master-slave flip-flop circuit 58 sampling on a leading edge of the clock signal H,
- a two-input AND logic gate 59,
- a selection circuit 60,
- a first inverter 61,
- a second inverter 62,
- a fourth master-slave flip-flop circuit 63 sampling on a leading edge of the clock signal H, and
- a two-input NOR logic gate.

The comparison circuit 54 is connected to the lines 6, the outputs of the comparison circuit 26 and outputs of the register 23. This circuit 54 has one output to give a logic signal such that the signal is in a given state if the break conditions memorized in the register 23 are verified on the lines 6 and the outputs of the comparison circuit 26. For example, the signal produced by the comparison circuit 54 will be in state 1 if the conditions are verified. If not, it will be in the state 0.

The output of the comparison circuit 54 is connected to the input of the first master-slave flip-flop circuit 55. The output of this first flip-flop circuit is connected to a first input of the multiplexer 56.

The multiplexer has a second input held at a permanent logic state 0.

The output of the multiplexer 56 is connected to the input of the second flip-flop circuit 57. The output of this flip-flop circuit 57 is connected firstly to the third input of the multiplexer 56 and secondly to the input of the third flip-flop circuit 58.

The output of the flip-flop circuit 58 is connected to an input of the AND gate 59. This gate 59 has its other input connected to an output of the selection circuit 60 which plays a role equivalent to that of the selection circuit 47 of FIG. 4. The output of the AND gate 59 is connected to the line 17 conveying the signal HALT.

The third flip-flop circuit 63 is connected to the line 42 by means of the inverter 62 and therefore receives the signal /TONWNCY. This flip-flop circuit has its output connected to a first control input of the multiplexer 56 in such a way that the output of this multiplexer is connected to its first input if the signal present at output of the flip-flop circuit 63 is in the state 1.

The output of the selection circuit 60 is connected by means of the inverter 61 to a second control input of the multiplexer 56 in such a way that the output of this multiplexer is connected to its second input if the signal present at this control input is in the state 1.

Finally, the multiplexer 56 has a third control input connected to the output of the NOR gate 64, the two inputs of this NOR gate being each connected to one of the two other control inputs of this multiplexer.

Thus if, during a cycle, all the expected conditions are verified on the address bus 4 and the line 6, the signal HALT will go to 1 at the start of the cycle following the one that marks the end of the performance of the instruction to which the address present on the bus corresponds when the conditions are verified.

Figure 7:
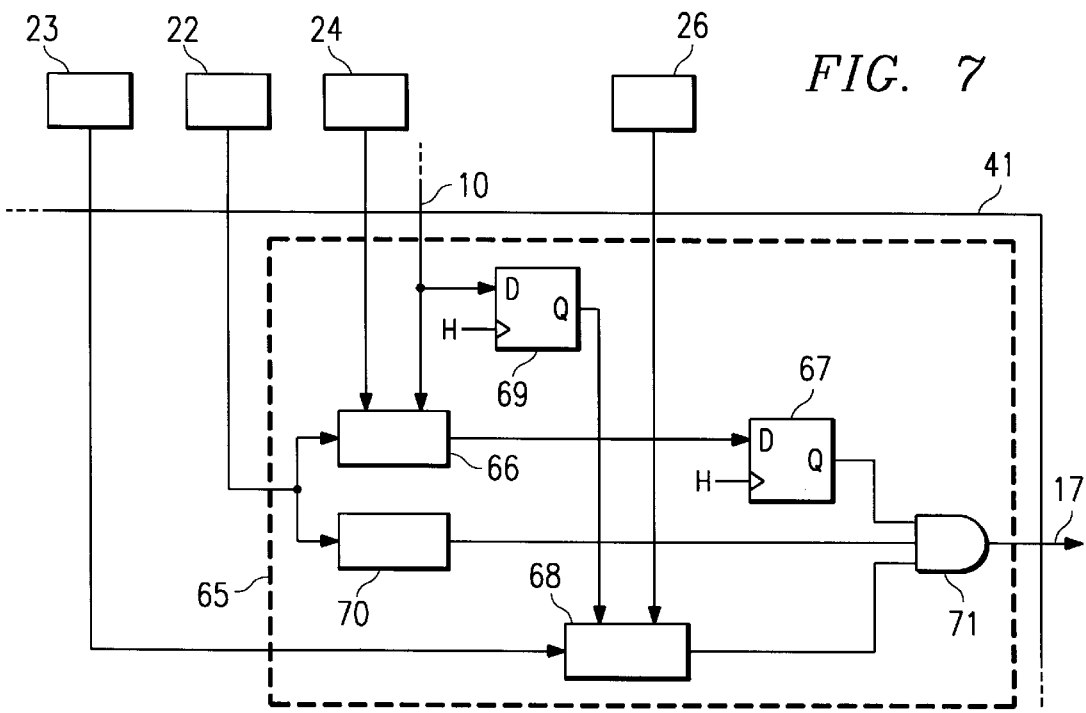

Breakpoint on the Data Bus and the Address Bus of a Data Memory, the Conditions having to be Verified during the Performance of One and the same Instruction (FIG. 7)

FIG. 7 illustrates the means implemented when it is desired to place a breakpoint on the address bus 8 and on the data bus 9 of the data memory 7, with conditions having to be verified for each bus during the performance of one and the same instruction.

To check that the break conditions are verified, it is possible to use one of the comparison circuits 24 or 25 according to choice, and the comparison circuit 26. In the example described, the comparison circuits 24 and 26 are used, the value present in the address bus 8 being compared actually with the value present at the outputs of the register 18 and the value present on the data bus 9 being compared with the value present on the outputs of the register 20.

To enable the halting of the performance of instructions by the central processing unit, the control circuit 41 has a circuit 65 to give the logic signal HALT.

This circuit 65 comprises:
- a first comparison circuit 66,
- a first master-slave flip-flop circuit 67 sampling on a leading edge of the clock signal H,
- a second comparison circuit 68,
- a second master-slave flip-flop circuit 69 with two inputs and two outputs sampling on a leading edge of the clock signal H,
- a selection circuit 70,
- a three-input AND logic gate 71.

The first comparison circuit 66 is connected to the lines 10 conveying the control signals for access to the memory 7. This circuit 66 is also connected to the outputs of the comparison circuit 24 and to outputs of the register 22. This circuit 66 has one output to give a logic signal such that the signal is in a given state if the break conditions memorized in the register 22 are verified on the lines 10 and the outputs of the comparison circuit 24. For example, the signal produced by the comparison circuit 66 will be in the state 1 if the conditions are verified. If not, it will be in the state 0.

The output of the comparison circuit 66 is connected to the input of the first flip-flop circuit 67. The output of this flip-flop circuit 67 is connected to an input of the AND logic gate 71. Another input of this AND gate is connected to an output of the selection circuit 70. This circuit 70 plays the same role as the selection circuit 47 of FIG. 4.

The output of the AND gate 71 is connected to the line 17 conveying the signal HALT.

The second master-slave flip-flop circuit 69 receives, at its inputs, the lines 10 conveying the control signals for access to the memory 7.

The second comparison circuit 68 is connected to the outputs of the flip-flop circuit 69, the outputs of the comparison circuit 26 and outputs of the registers 23. This circuit 68 has one output to give a logic signal such that this signal is in a given state if the break conditions memorized in the register 23 are verified on the lines 20 and the outputs of the comparison circuit 26. For example, the signal produced by the comparison circuit 68 will be in the state 1 if the conditions are verified. If not, it will be in the state 0.

The output of the comparison circuit 68 is connected to the last input of the AND logic gate 71.

Thus if, during a cycle, all the expected conditions are verified on the data bus 9 and address bus 8 and the lines 10, the signal HALT will go to 1 at the start of the next cycle.

To place a breakpoint on the address bus 12 and data bus 13 of the other data memory 11, it is enough to duplicate the circuit 65 by adapting the links between this circuit and its environment to this particular case. Similarly, to place the other breakpoints corresponding to the other cases of simultaneity, the circuit described here above shall be duplicated as many times as necessary by adapting the links and the elements of the circuits to each case, in referring to FIGS. 4 to 6 as regards the constitution of these circuits.

Figure 8:
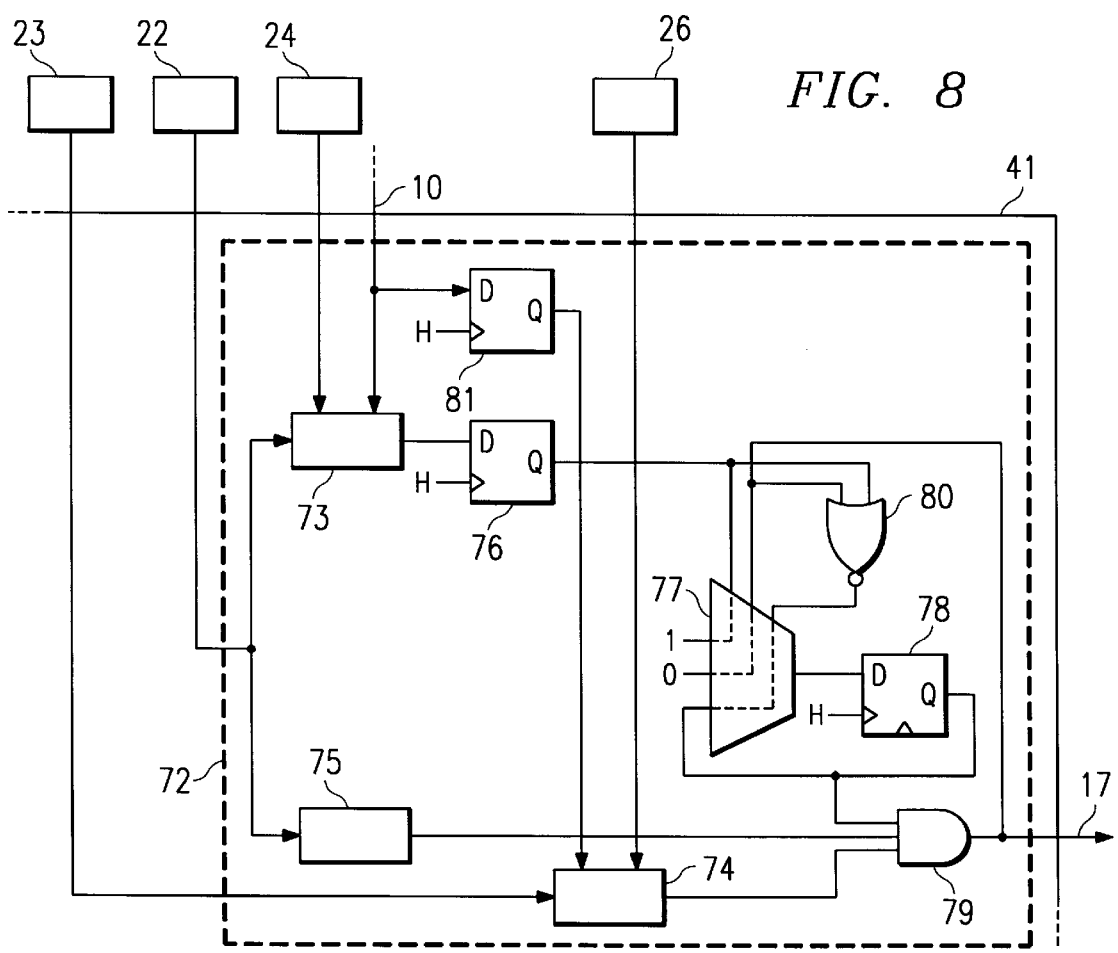

Breakpoint Between a Data Bus and an Address Bus of a Data Memory, the Performance being Halted if Conditions are Verified on the Data Bus while other Conditions have been Verified on the Address Bus during the Performance of a Previous Instruction (FIG. 8)

The example illustrated in FIG. 8 enables the processing of this case with regard to the data memory 7.

To check that the break conditions are verified for the address bus 8, it is possible to use one of the comparison circuits 24 or 25 according to choice. In the example described, the comparison circuit 24 is used, the value present on the address bus 8 being actually compared with the value present on the outputs of the register 18.

Furthermore, the comparison circuit 26 is used to check that the conditions relating to the data bus 9 are verified and the value present on this data bus 9 is compared with the value present on the outputs of the register 20.

To make it possible to halt the performance of instructions by the central processing unit, the control circuit 41 comprises a circuit 72 to give the logic signal HALT.

This circuit 72 comprises:

a first comparison circuit 73, a second comparison circuit 74, a selection circuit 75, a first master-slave flip-flop circuit 76 sampling on a leading edge of the clock signal H.

a three-input multiplexer 77, a second master-slave flip-flop circuit 78 sampling on a leading edge of the clock signal H, a three-input AND logic gate 79, a two input NOR logic gate 80, and a third master-slave flip-flop circuit 81 with two inputs and two outputs, sampling on a leading edge of the clock signal H.

The first comparison circuit 73 is connected to the lines 10 conveying the control signals for access to the memory 7. This circuit 73 is also connected to the outputs of the comparison circuit 24 and to outputs of the register 22. This circuit 73 has one output to give a logic signal such that this signal is in a given state if the break conditions memorized in the register 22 are verified on the lines 10 and the outputs of the comparison circuit 24. For example, the signal produced by the comparison circuit 73 will be in the state 1. if the conditions are verified. If not, it will be in the state 0.

The output of the comparison circuit 73 is connected to the input of the first flip-flop circuit 76.

The multiplexer 77 has a first input receiving a signal held in the logic state 1, a second input receiving a signal held in the logic state 0 and its last input connected to the output of the second flip-flop circuit 78.

The output of the flip-flop circuit 76 is connected to a first control input of the multiplexer 77 so that the output of the multiplexer 77 is connected to its first input when the signal at output of the flip-flop circuit 76 is in the state 1. The multiplexer has a second control input connected to the output of the AND gate 79 so that its output is connected to its second input arid the output signal of the gate 79 is in the state 1. Finally, the multiplexer has a third control input connected to the output of the NOR gate 80 so that its output is connected to its last input when the signal at output of the gate 80 is in the state 1.

The NOR gate 80 has each of its inputs connected to another of the control inputs of the multiplexer 77.

The output of the multiplexer 77 is connected to the input of the flip-flop circuit 78. The output of this flip-flop circuit is connected to a first input of the AND gate 79.

Another input of this AND gate is connected to an output of the selection circuit 75. This circuit 75 fulfills the same role as the selection circuit 47 of FIG. 4.

The output of the AND gate 79 is connected to the line 17 conveying the signal HALT.

The second master-slave flip-flop circuit 81 receives, at its inputs, the lines 10 conveying the control signals for access to the memory 7.

The second comparison circuit 74 is connected to the outputs of the flip-flop circuit 81, the outputs of the comparison circuit 26 and outputs of the register 23. This circuit 74 has one output to give a logic signal such that this signal is in a given state if the break conditions memorized in the register 23 are verified on the lines 10 and the outputs of the comparison circuit 26. For example, the signal produced by the comparison circuit 74 will be the state 1 if the conditions are verified. If not it will be in the state 0.

The output of the comparison circuit 74 is connected to the last input of the AND logic gate 79.

Thus if, during a cycle, all the expected conditions are verified on the address bus 8, the output of the flip-flop circuit 78 will give a signal with a logic state 1.

If, subsequently, all the conditions are verified on the data bus 9, the signal HALT will go to 1 at the start of the next cycle.

To place a breakpoint on the address bus 12 and data bus 13 of the other data memory 11, it is enough to duplicate the circuit 72 by adapting the links between this circuit and its environment to this particular case.

Figure 9:
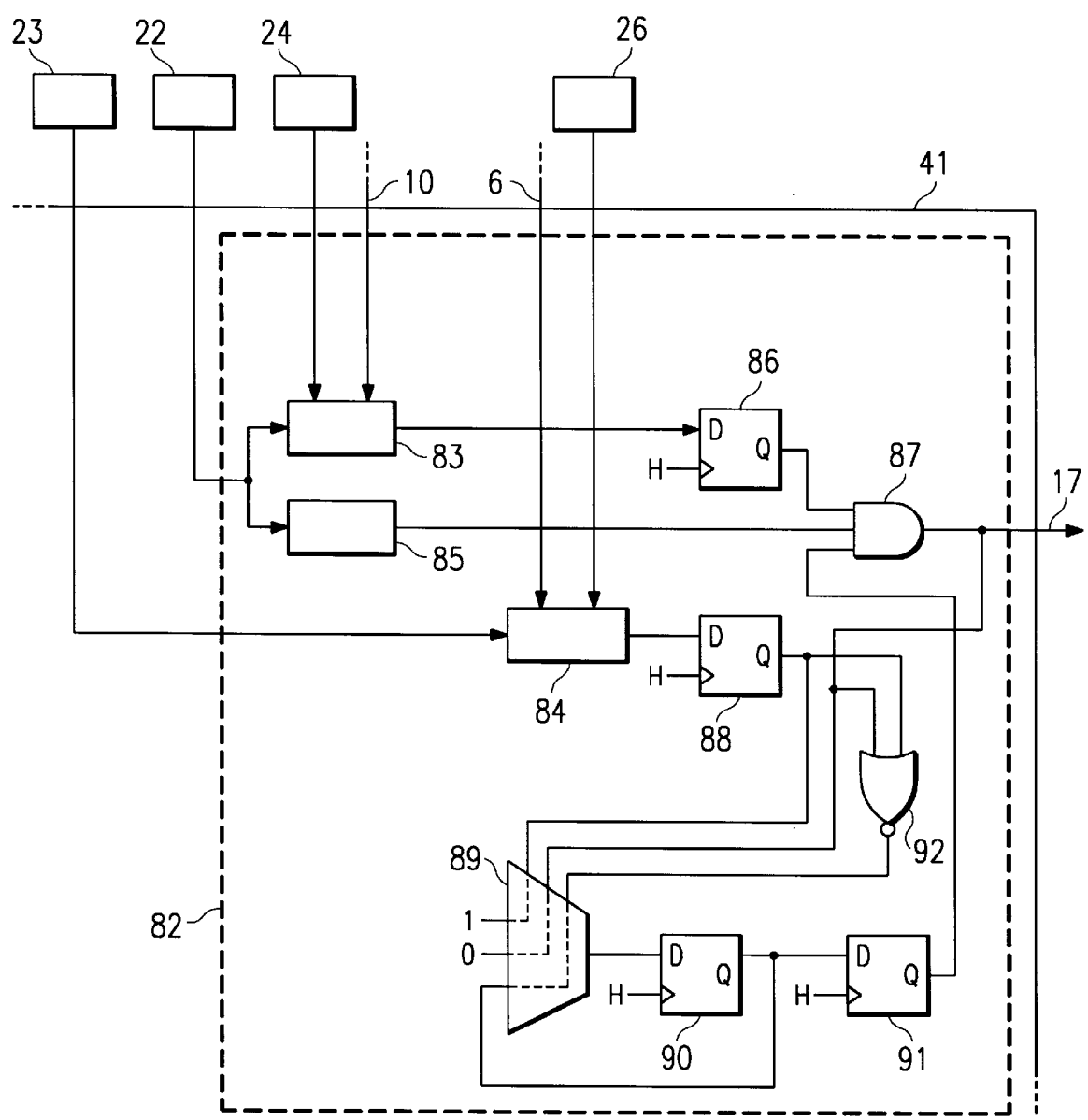

Breakpoint Between the Address Buses of a Data Memory and of the Program Memory, the Performance being Halted if Conditions are Verified on the Address Bus of the Data Memory while other Conditions have been Verified on the Address Bus of the Program Memory During the Performance of a Previous Instruction (FIG. 9).

The example shown in FIG. 9 enables the processing of this case as regards the data memory 7.

To check that the break conditions are verified for the address bus 8, it is possible to use one of the comparison circuits 24 or 25 according to choice. In the example described, the comparison circuit 24 is used, the value present on the address bus 8 being actually compared with the value present on the outputs of the register 18.

Furthermore, the comparison circuit 26 is used to ascertain that the conditions relating to the data bus 4 are verified and the value present on this data bus 4 is compared with the value present on the outputs of the register 20.

To make it possible to halt the performance of instructions by the central processing unit, the control circuit 41 comprises a circuit 82 to give the logic signal HALT.

This circuit 82 comprises:

a first comparison circuit 83, a second comparison circuit 84, a selection circuit 85, a first master-slave flip-flop circuit 86 sampling on a leading edge of the clock signal H.

a three-input multiplexer 89, a second master-slave flip-flop circuit 88 sampling on a leading edge of the clock signal H.

a third master-slave flip-flop circuit 90 sampling on a leading edge of the clock signal H, a fourth master-slave flip-flop circuit 91 sampling on a leading edge of the clock signal H, a three-input AND logic gate 87, a two-input NOR logic gate 92.

The first comparison circuit 83 is connected to the lines 10 conveying the control signals for access to the memory 7. This circuit 83 is also connected to the outputs of the comparison circuit 24 and to outputs of the register 22. This circuit 83 has one output to give a logic signal such that this signal is in a given state if the break conditions memorized in the register 22 are verified on the lines 10 and the outputs of the comparison circuit 24. For example, the signal produced by the comparison circuit 83 will be in the state 1 if the conditions are verified. If not, it will be in the state 0.

The output of the comparison circuit 83 is connected to the input of the first flip-flop circuit 86. The output of this flip-flop 86 is connected to a first input of the NOR gate 87.

The second comparison circuit 84 is connected to the lines 6. This circuit is also connected to the outputs of the comparison circuit 26 and to outputs of the register 23. This circuit 84 has one output to give a logic signal such that this signal is in a given state if the break conditions memorized in the register 23 are verified on the lines 6 and the outputs of the comparison circuit 26. For example, the signal, produced by the comparison circuit 84 will be in the state 1 if the conditions are verified. If not, it will be in the state 0.

The output of the comparison circuit 84 is connected to the input of the second flip-flop circuit 88.

The multiplexer 89 has a first input receiving a signal held at the logic state 1, a second input receiving a signal held at the logic state 0 and its last input connected to the output of the third flip-flop circuit 90.

The output of the flip-flop circuit 88 is connected to a first control input of the multiplexer 89 so that the output of the multiplexer 89 is connected to its first input when the signal at output of the flip-flop circuit 88 is in the state 1. The multiplexer has a second control input connected to the output of the AND gate 87 so that its output is connected to its second input when the signal at output of the gate 87 is in the state 1. Finally, the multiplexer has a third control input connected to the output of the NOR gate 92 so that its output is connected to its last input when the signal at output of the gate 92 is in the state 1.

The NOR gate 92 has each of its inputs connected to another of the control inputs of the multiplexer 89.

The output of the multiplexer 89 is connected to the input of the flip flop circuit 90. The output of this flip-flop circuit is connected to the input of the fourth flip-flop circuit 91. The output of this flip-flop circuit 91 is connected to a second input of the AND gate 87.

Another input of this AND gate is connected to an output of the selection circuit 85. This circuit 85 plays the same role as the selection circuit 47 of FIG. 4.

The output of the AND gate 87 is connected to the line 17 conveying the signal HALT.

Thus if, during a cycle, all the expected conditions are verified on the address bus 4, the output of the flip-flop circuit 91 will give a signal with a logic state 1 at the start of the cycle following the one corresponding to the performance of the word placed at the address for which the conditions are verified.

If, during the performance of a subsequent instruction or during the performance of the same instruction, all the conditions are verified on the address bus 8, the signal HALT will go to 1 at the start of the next cycle.

Similarly, to place the other breakpoints corresponding to the other cases of consecution, the circuit described here above will be duplicated as many times as necessary by adapting the links and the elements of the circuit to each case, referring to FIGS. 4 and 6 as regards the constitution of these circuits.

It will be noted that to process the case of a consecution relating to the address buses of the data memories, only one circuit is enough to process both possible cases owing to the presence of the comparison circuits 24 and 25. It will be enough, for example, to use the first comparison circuit to verify the conditions that have to appear initially by adapting the control signals of the multiplexers 28 and 29 to the case to be treated.

Although not described, it is of course clear that the control circuit will comprise additional selection means so as to connect only one output of a NAND gate at a time to the line 17. Otherwise a problem of conflict will arise on this line.

Similarly, the control circuit could include means such as those described for the circuit 53 so that the performance of the instruction is halted only from the time when all the instructions, which have been decoded at the time of verification of a breakpoint, have been performed.

Although the invention has been described with reference to an exemplary embodiment, it will be understood that this example is not restrictive and that various modifications may be made to it without departing from the framework of the invention.

What is claimed is:

1. An integrated circuit comprising:

a central processing unit, a program memory containing a program of instructions connected to the central processing unit by an address bus, a data bus and lines giving control signals for read and write access to this memory, the instructions being carried out by the central processing unit, and at least one data memory connected to the central processing unit by an address bus, a data bus and lines giving control signals for read and write access to this memory, wherein the circuit comprises breaking means which defines a combination of conditions pertaining to the values present on two of the buses of the memories and to the values of the control signals for access to at least one of these memories, and which halts the performance of the instructions if these conditions are verified, wherein the halting is delayed if the verified conditions are related to the address buses, and the verification of the conditions is delayed in comparison with the appearance of the values on the buses if the conditions are related to the data buses.

2. A circuit according to claim 1, wherein the breaking means halt the performance of the instructions if the conditions of a combination are verified during the processing of one and the same instruction.

3. A circuit according to claim 1, wherein the circuit is arranged in such a way that, if an instruction is decoded while conditions are verified, the breaking means halt the performance of the instructions after the performance of this instruction.

4. A circuit according to claim 1, wherein the conditions are memorized in memory mapped configurable registers.

5. A circuit according to claim 1 dedicated to signal processing.

6. An integrated circuit comprising:

a central processing unit, a program memory containing a program of instructions connected to the central processing unit by an address bus, a data bus and lines giving control signals for read and write access to this memory, the instructions being carried out by the central processing unit, and at least one data memory connected to the central processing unit by an address bus, a data bus and lines giving control signals for read and write access to this memory, wherein the circuit comprises breaking means which defines a combination of conditions pertaining to the values present on two of the buses of the memories and to the values of the control signals for access to at least one of these memories, and which halts the performance of the instructions if these conditions are verified, wherein the halting is delayed if the verified conditions are related to the address buses, and the verification of the conditions is delayed in comparison with the appearance of the values on the buses if the conditions are related to the data buses, wherein the breaking means do not halt the performance of the instruction unless, during the processing of an instruction, the conditions of a combination relating to the value present on a bus of one of the memories and to the values of the control signals for access to this memory are verified, the other conditions of the combination relating either to the value present at the other bus of this memory or to the value present at a bus of the other memory and to the values of the control signals for access to this other memory that have been verified previously during the processing of another instruction.

7. A circuit according to claim 1, comprising additional breaking means defining, for each memory, conditions relating to the value present on its address bus and to the values of the control signals for access to this memory, and halting the performance of the instructions if, for one of the memories, these conditions are verified.

8. A circuit according to claim 6, comprising additional breaking means defining, for each memory, conditions relating to the value present on its address bus and to the values of the control signals for access to this memory, and halting the performance of the instructions if, for one of the memories, these conditions are verified.

9. A circuit according to claim 6, wherein the circuit is arranged in such a way that, if an instruction is decoded while conditions are verified, the breaking means halt the performance of the instructions after the performance of this instruction.

10. A circuit according to claim 6, wherein the conditions are memorized in memory mapped configurable registers.

11. An integrated circuit comprising:

a central processing unit, a program memory containing a program of instructions connected to the central processing unit by an address bus, a data bus and lines giving control signals for read and write access to this memory, the instructions being carried out by the central processing unit, and at least one data memory connected to the central processing unit by an address bus, a data bus and lines giving control signals for read and write access to this memory, wherein the circuit comprises breaking means which defines a combination of conditions pertaining to the values present on two of the buses of the memories and to the values of the control signals for access to at least one of these memories, and which halts the performance of the instructions if these conditions are verified, wherein the halting is delayed if the verified conditions are related to the address buses, and the verification of the conditions is delayed in comparison with the appearance of the values on the buses if the conditions are related to the data buses, comprising additional breaking means defining, for each memory, conditions relating to the value present on its data bus and to the values of the control signals for access to this memory, and halting the performance of the instructions if, for one of the memories, these conditions are verified.

12. A circuit according to claim 11, wherein the circuit is arranged in such a way that, if an instruction is decoded while conditions are verified, the breaking means halt the performance of the instructions after the performance of this instruction.

13. A circuit according to claim 11, wherein the conditions are memorized in memory mapped configurable registers.

14. An integrated circuit comprising:

a central processing unit, a program memory containing a program of instructions connected to the central processing unit by an address bus, a data bus and lines giving control signals for read and write access to this memory, the instructions being carried out by the central processing unit, and at least one data memory connected to the central processing unit by an address bus, a data bus and lines giving control signals for read and write access to this memory, wherein the circuit comprises breaking means which defines a combination of conditions pertaining to the values present on two of the buses of the memories and to the values of the control signals for access to at least one of these memories, and which halts the performance of the instructions if these conditions are verified, wherein the halting is delayed if the verified conditions are related to the address buses and the verification of the conditions being delayed in comparison with the appearance of the values on the buses if the conditions are related to the data buses, wherein the circuit has a second data memory.

15. A circuit according to claim 14, wherein the conditions are memorized in memory mapped configurable registers.

* * * * *